No. 848,929. PATENTED APR. 2, 1907.
F. P. SMITH.
APPARATUS FOR DISCHARGING LIQUIDS.
APPLICATION FILED JULY 17, 1906.
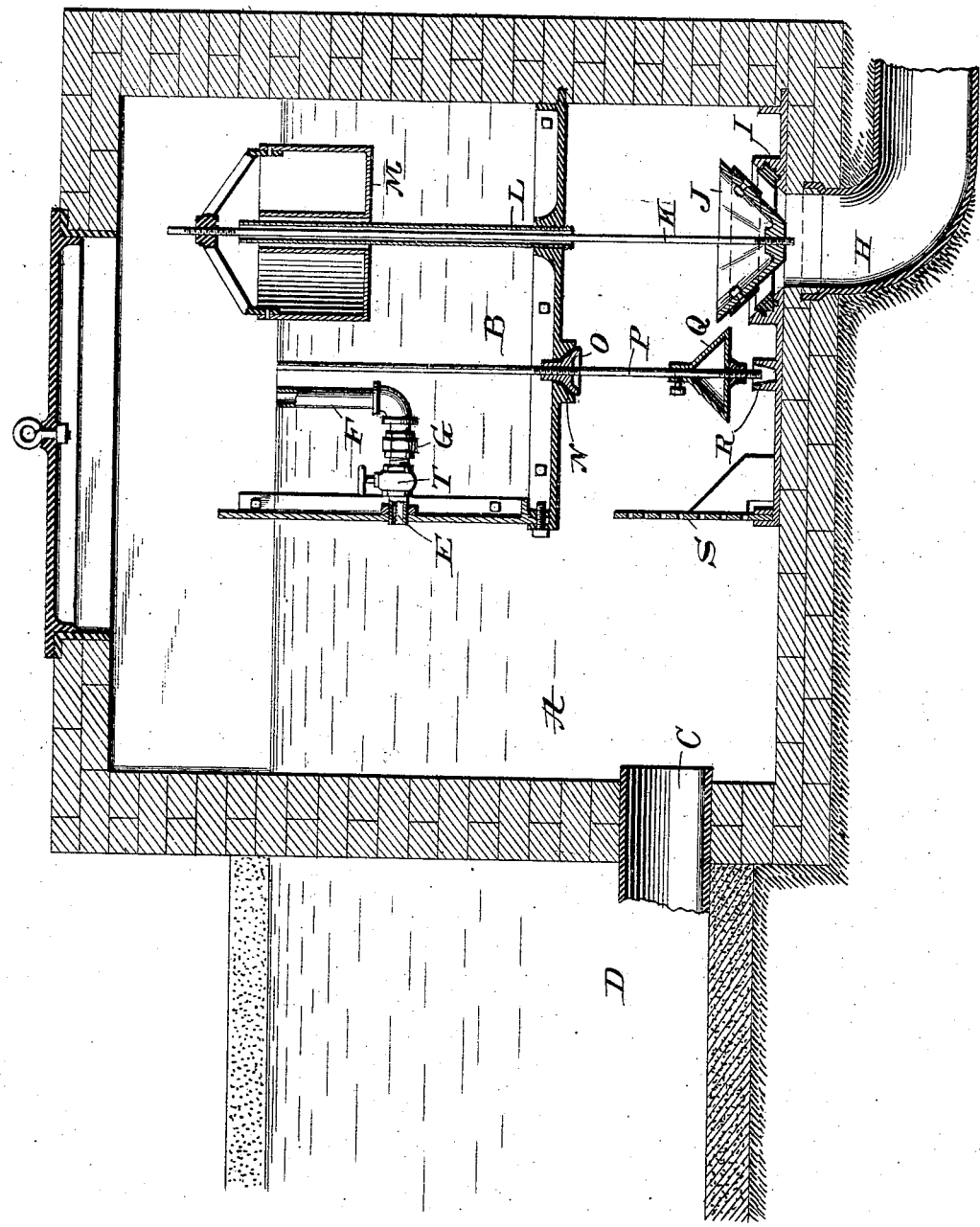

UNITED STATES PATENT OFFICE.

FRED P. SMITH, OF CHICAGO, ILLINOIS, ASSIGNOR OF ONE-HALF TO EDWARD C. LEWIS, OF CHICAGO, ILLINOIS, AND JOHN H. KITCHEN, OF KANSAS CITY, MISSOURI, COPARTNERS.

APPARATUS FOR DISCHARGING LIQUIDS.

No. 848,929.     Specification of Letters Patent.     Patented April 2, 1907.

Application filed July 17, 1906. Serial No. 326,578.

*To all whom it may concern:*

Be it known that I, FRED P. SMITH, a citizen of the United States, residing at Chicago, in the county of Cook and State of Illinois, have invented certain new and useful Improvements in Apparatus for Discharging Liquids, of which the following is a specification.

My present invention relates to an improved apparatus for discharging liquids, the construction and advantages of which will be hereinafter set forth, reference being had to the annexed drawing, wherein the apparatus is shown in vertical section.

The main object of the invention is to provide means whereby liquid may be automatically discharged from a reservoir, filter-bed, or the like after it shall have remained in said reservoir or bed for a desired measurable period.

A further object of the invention is to provide means whereby the period of discharge may be regulated as desired.

With these and other objects in view I will now describe the invention.

In the drawing, A designates the main measuring chamber or receptacle, and B the supplemental measuring chamber or tank. The chamber A is formed of masonry or the like, and tank B is located therein, preferably to one side and, as shown, at some distance above the bottom of the chamber A. Said chamber is in communication through a pipe C with a filter-bed or reservoir D. The tank or chamber B is in communication with the chamber A through a valved inlet E, which communicates with a pipe F, the upper end of which may be raised or lowered by swinging it upon a joint G, by which it is connected to the valved pipe. The water or other liquid passing into chamber B must of necessity pass through this pipe, and the height to which the water will rise in said supplemental chamber B is controlled by the elevation of the mouth of the pipe F.

The chamber A is provided with an outlet H at the bottom thereof, a valve-seat I, preferably of lead, being arranged above the mouth of the outlet and designed to coact with a valve J, adjustably secured to the lower end of a valve-stem K, which extends upwardly through a pipe L, secured to the bottom of the tank or chamber B and projecting upwardly therein. Adjustably secured to the upper end of said valve-stem K is a float M.

The bottom of the tank or chamber B is provided with an opening N, adapted under certain conditions to be closed by a valve O, adjustably mounted upon a valve-stem P. Near the lower end of said stem is adjustably secured a float Q, the stem being held against lateral displacement by a guide R, which surrounds its lower extremity.

A perforated surge-preventing plate S is located between the inlet-pipe C and the valves in order to prevent undue currents or flow of liquid from affecting the proper functioning of the valves.

The operation of the apparatus is as follows: Normally the valve J is closed upon its seat I. As the water or other liquid flows into the chamber or receptacle A from bed or reservoir D it gradually fills the same, and valve O is held against its seat by the float Q. The liquid will continue to rise in the chamber or receptacle A until it reaches the level of the upper end of pipe F, when it will overflow through the valved inlet E into chamber B. When the liquid in said chamber B has reached the water-level of the other chambers, the float M will raise the valve J from its seat, and the water or other liquid in chambers A and D will flow therefrom through the outlet H. The liquid will continue to discharge so long as the valve O is held to its seat by the float Q. When the liquid has reached a level in the chamber A below the bottom of the bed D to be drained, the float Q will drop, and consequently the valve O will be opened, permitting the liquid to pass from the tank B, thus allowing the float M to descend and close the valve J upon its seat I.

The point or level of discharge of chambers A and D may be readily determined by raising or lowering the outlet of the pipe F, and the time of discharge by adjusting the valve T, controlling inlet E.

The essential feature of the apparatus is its easy adaptability to adjustment to any water-line within reasonable variations, which may be secured when filling a filter-bed from a preliminary measuring-chamber.

Having thus described my invention, what I claim is—

1. In combination with a chamber or receptacle provided with an outlet; a tank likewise provided with an outlet which opens into the chamber or receptacle; an inlet for the tank communicating with the chamber; a float located in the tank; a valve controlled by said float for opening and closing the outlet of the chamber; a valve for closing the opening leading from the tank to the chamber; and a float mounted in the chamber and connected to said valve.

2. In combination with a chamber; a tank communicating therewith; means for controlling the water-line within said tank; a valve for controlling the outlet of the chamber; and a float mounted in the tank and connected to the valve, whereby when the water or other liquid within the tank reaches a predetermined height the valve will be opened and the chamber discharged.

3. In combination with a chamber provided with an outlet; a tank in communication therewith; means contained within the tank for regulating the water-line therein; a float mounted in the tank; a valve connected to the float and serving, when the float is lowered, to close the outlet of the chamber; and means for discharging the tank when the chamber is emptied.

4. In combination with a chamber provided with an outlet; a tank; a pipe affording communication between said chamber and tank, the outer end of the pipe being adjustable to a higher or lower plane; a float mounted in the tank; a valve connected to the float and serving, when lowered, to close the outlet of the chamber; and means for discharging the tank when the chamber has been emptied.

5. In combination with a chamber provided with an outlet; a tank communicating with said chamber through a restricted opening; a discharge-pipe located within the tank and communicating with said restricted opening, the mouth of said pipe being adjustable to a higher or lower level, whereby the flow of liquid from the chamber into the tank and the water-level within the tank may be regulated as desired; a float mounted in the tank; a valve-stem connected to said float; a valve adjustably secured at the lower end of the stem and arranged to close the outlet of the chamber when the float is lowered; a second valve arranged to open and close a passage leading from the tank directly to the chamber; a valve-stem for said valve; and a float secured to said stem and located within the chamber.

6. In combination with a measuring-chamber provided with an outlet; a valve normally closing said outlet against the passage of liquid from the chamber; a tank in communication with said measuring-chamber; and means contained within the tank for operating the valve according to the height of water or other liquid in the tank, substantially as described.

In testimony whereof I have signed my name to this specification in the presence of two subscribing witnesses.

FRED P. SMITH.

Witnesses:
  HORACE A. DODGE,
  FANNIE WISE.